(12) United States Patent
Madsen

(10) Patent No.: US 6,580,534 B2
(45) Date of Patent: *Jun. 17, 2003

(54) OPTICAL CHANNEL SELECTOR

(75) Inventor: Christi Kay Madsen, South Plainfield, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,222

(22) Filed: Jan. 27, 1999

(65) Prior Publication Data

US 2002/0159686 A1 Oct. 31, 2002

(51) Int. Cl.$^7$ .......................... H04B 10/00; H04J 14/02; G02B 6/26; G02B 6/42
(52) U.S. Cl. ................... 359/121; 385/24; 385/37; 385/32; 385/27; 359/127
(58) Field of Search ................ 359/121, 127; 385/32, 24, 27

(56) References Cited

U.S. PATENT DOCUMENTS

| | | | | |
|---|---|---|---|---|
| 5,414,548 A | * | 5/1995 | Tachikawa et al. | 359/130 |
| 5,471,180 A | * | 11/1995 | Brommer et al. | 333/202 |
| 5,523,874 A | * | 6/1996 | Epworth | 359/161 |
| 5,903,691 A | * | 5/1999 | Wisseman et al. | 359/115 |
| 6,084,992 A | * | 7/2000 | Weber, deceased et al. | 359/123 |
| 6,289,151 B1 | * | 11/2001 | Kazarinov et al. | 385/32 |

OTHER PUBLICATIONS

"Synthesis of Coherent Two–Port Optical Delay–Line Circuit with Ring Waveguides", by Jinguji, K., *Journal of Lightwave Technology*, vol. 14, No. 8, pp. 1882–1898 (Aug. 1996).

"A Wide–band Guided–Wave Periodic Multi/Demultiplexer with a Ring Resonator for Optical FDM Transmission Systems", by Oda, K. et al., *Journal of Lightwave Technology* vol. 6, No. 6, pp. 1016–1023 (Jun. 1998).

"A General Planar Waveguide Autoregressive Optical Filter", by Madsen, C. et al., *Jouranl of Lightwave Technology*, vol. 14, No. 3, pp. 437–447 (Mar. 1996).

\* cited by examiner

Primary Examiner—Leslie Pascal
Assistant Examiner—David C. Payne

(57) ABSTRACT

A channel selector which selects one or more channels from input multi-channel optical signals for routing to predetermined destinations within an optical communication system is disclosed. The channel selector selects one or more channels by first splitting portions of the input multi-channel optical signals across two or more optical paths. Thereafter, a desired phase response is applied to the split portions of the multi-channel optical signals. The desired phase response is applied to the split portions of the multi-channel optical signals so the channels therein interfere with each other either constructively or destructively when the split portions of the multi-channel optical signals are combined. The channel selector has a structure which includes a plurality of input ports, a plurality of output ports, a splitter, a combiner, one or more all-pass optical filters, and a plurality of optical paths.

18 Claims, 10 Drawing Sheets

OPTICAL CHANNEL SELECTOR

FIELD OF THE INVENTION

The present invention relates generally to optical communication systems, and more particularly, to channel selectors useful for wavelength division multiplexed (WDM) optical communication systems.

DESCRIPTION OF THE RELATED ART

Optical communication systems typically include a variety of devices (e.g., light sources, photodetectors, switches, optical fibers, modulators, amplifiers, and filters). For example, in the optical communication system 1 shown in FIG. 1, a light source 2 generates optical signals 3. Each optical signal 3 comprises a plurality of wavelengths. The optical signals 3 are transmitted from the light source 2 to a detector 5. Typically, an optical fiber 4 transmits the optical signals 3 from the light source 2 to the detector 5. The optical fiber 4 has amplifiers (not shown) and filters (not shown) positioned along its length. The amplifiers and filters propagate the optical signals 3 along the length of the optical fiber 4 from the light source 2 to the detector 5.

Some optical communications systems include a single channel. Single channel optical communications systems transmit optical signals at a single specified channel wavelength. The transmission rate of a single channel is about 2.5 Gbits/sec (Gigabits/second). Consequently, the transmission capacity of single channel optical communication systems is limited to about 2.5 Gbits/sec.

One technique used to increase the transmission capacity of optical communication systems is wavelength division multiplexing (WDM). WDM optical communication systems are multi-channel systems. Each channel of the multi-channel system transmits optical signals using wavelengths that are different from one another. In WDM systems, optical signals are simultaneously transmitted over the multiple channels.

WDM systems are desirable because their total transmission capacity increases relative to single channel systems as a function of the number of channels provided. For example, a four-channel WDM optical communication system can transmit optical signals at a rate of about 10 Gbit/sec (4×2.5 Gbit/sec). Since a single channel system only transmits optical signals at a rate of about 2.5 Gbit/sec, the four-channel WDM system has about 400% greater capacity than the single-channel system.

In a WDM optical communication system, the optical signals are multiplexed over multiple channels. Thereafter, the multiplexed optical signals are transmitted over a waveguide (e.g., optical fiber). At the receiving end, the multiplexed optical signals are demultiplexed such that each of the multiple channels is routed individually to a designated receiver by a channel selector. Typically, the channels are routed using mode couplers (e.g., multi-mode interference couplers or star couplers) or diffraction gratings.

In order for the channel selector to route each channel to the designated receiver, it is desirable that the wavelengths of the selected channels correspond to the passband of the channel selector. The term passband as used in this disclosure refers to the band of wavelengths transmitted by the channel selector, denoted as 10 in FIG. 2A. When the wavelengths of the selected channels and the passband of the channel selector do not correspond, the channel selector can not route the selected channels to the designated receivers.

Additionally, it is desirable for the channel selector to have a passband with sharp cut-off regions. The cut-off regions of the passband refer to the transition region from the passband to the stopband, denoted as 12 in FIG. 2A. The term stopband as used in this disclosure refers to the band of wavelengths not transmitted by the channel selector, denoted as 11 in FIG. 2A. Sharp cut-off regions have steep slopes. When the passband of the channel selector does not have cut-off regions with steep slopes adjacent channels potentially interfere (crosstalk) with each other. Interference between adjacent channels, denoted as 14 in FIG. 2B, causes transmission errors.

Oda, K. et al., "A Wide-Band Guided-Wave Periodic Multi/Demultiplexer with a Ring Resonator for Optical FDM Transmission Systems", *IEEE J. Light. Tech.*, Vol. 6, No. 6, pp. 1016–1022 (1988) describes a channel selector for use in a WDM optical communication system. The channel selector has a structure which combines a single Mach-Zehnder Interferometer (MZI) with a ring resonator. In Oda et al., the coupling ratio between the ring resonator and the MZI has a fixed value of 8/9. This fixed value for the coupling ratio limits the passband width of the Oda et al. channel selector to about half the free spectral range (FSR). Typically, the FSR describes the band of multiplexed channel wavelengths transmitted in a WDM system. Since the passband width of the channel selector only corresponds to half the wavelengths of the FSR, the Oda et al. channel selector is useful for selecting only a limited number of multiplexed channels.

Another channel selector for a WDM optical communication system, an autoregressive moving average (ARMA) filter, is described in Jinguji, K., "Synthesis of Coherent Two-Port Optical Delay-Line Circuit with Ring Waveguides", *IEEE J. Light. Tech.*, Vol. 14, No. 8, pp. 1882–1898 (1996). Autoregressive moving average filters include both poles and zeros in their transfer functions. The Jinguji ARMA filter includes a structure that has a cascade of MZIs with a single ring resonator on one arm of each MZI. Both the MZIs and the ring resonators also include phase shift controllers. Such a filter architecture is complex and difficult to fabricate since a large number of MZIs are needed for channel selection. Additionally, all Jinguji filter architectures must be ring resonator based structures.

Thus, channel selectors for use in WDM systems that have advantages over prior art channel selectors are sought.

SUMMARY OF THE INVENTION

The present invention is directed to a channel selector useful for a multi-channel WDM optical communications system. The channel selector selects one or more channels from input multi-channel optical signals for routing to predetermined destinations within the optical communication system. Multi-channel optical signals include two or more channels, wherein each channel transmits optical signals of a specified wavelength. The channel selector selects one or more channels by first splitting (dividing) portions of the input multi-channel optical signals across two or more optical paths. Thereafter, a desired phase response is applied to the split portions of the multi-channel optical signals. The desired phase response is applied to the split portions of the multi-channel optical signals so the channels therein interfere with each other either constructively or destructively when the split portions of the multi-channel optical signals are combined.

The desired phase response is applied to the split portions of the multi-channel optical signals by shifting the phase of each channel in the multi-channel optical signal as a function of frequency. Phase-shifted channels which have approximately the same phase constructively interfere with each other when the sum of their magnitudes is greater than zero. Phase-shifted channels destructively interfere with each other when the sum of their magnitudes approximates zero. Channels which interfere with each other constructively are selected by the channel selector. Channels which interfere with each other destructively are not selected by the channel selector.

The channel selector of the present invention has a structure which includes a plurality of input ports, a plurality of output ports, a splitter, a combiner, one or more all-pass optical filters, and a plurality of optical paths. Each optical path has one input and one output. The plurality of input ports are coupled to the inputs of the plurality of optical paths via the splitter. The outputs of the plurality of optical paths are coupled to the plurality of output ports via the combiner. The one or more all-pass optical filters are coupled to the plurality of optical paths.

The splitter determines what portion of input multi-channel optical signals are split (divided) across the plurality of optical paths. Typically, the multi-channel optical signals are split across the plurality of optical paths with couplers (e.g., multi-mode interference couplers and star couplers).

After the multi-channel optical signals are split across the plurality of optical paths, the one or more all-pass optical filters apply the frequency dependent phase shift (e.g., time delay) to each channel of the multi-channel optical signals provided thereto. Thereafter, the combiner combines the phase shifted multi-channel optical signals, directing selected channels to predetermined destinations within the optical communication system through one or more of the plurality of output ports. Typically, the multi-channel optical signals are combined using couplers (e.g., multi-mode interference couplers and star couplers).

Each of the one or more all-pass optical filters of the channel selector of the present invention includes at least one feedback path, a splitter/combiner, a filter input port, and a filter output port. The splitter/combiner is coupled to at least one of the feedback paths, the filter input port, and the filter output port.

Coupling ratios for the splitter/combiner and the feedback path determine what portions of the multi-channel optical signals are coupled into and away from the feedback path from the optical path. The magnitude of the coupling ratios for the splitter/combiner and the feedback path are a matter of design choice.

The at least one feedback path of the all-pass optical filter applies the desired phase response to each channel of the multi-channel optical signals transmitted therethrough. Each of the at least one feedback paths of the one or more all-pass optical filters has a path length. The path lengths of each feedback path are optionally different. Feedback paths with different path lengths are desirable because they potentially increase the FSR of the channel selector.

In one embodiment of the present invention, the at least one feedback path of the one or more all-pass optical filters has a ring resonator structure. The ring resonator structure includes one or more ring resonators where each of the ring resonators is a closed loop. The one or more ring resonators are optionally arranged as a ring cascade or as a series of coupled rings. For the ring cascade, one ring resonator is coupled to the splitter/combiner with the remaining ring resonators, coupled one to another. In the series of coupled rings, each ring is coupled to the splitter/combiner.

In an alternate embodiment of the present invention, the at least one feedback path of the all-pass optical filter includes a cavity and a plurality of reflectors. At least one reflector of the plurality of reflectors has a reflectivity of about 100%, while the remaining reflectors are partial reflectors with reflectivities less than 100%. Twice the length of the cavity approximates the path length of the feedback path. The partial reflectors perform the functions of the splitter/combiner.

Another embodiment of the present invention uses a photonic band gap (PBG) structure as the at least one feedback path of the one or more all-pass optical filters. The photonic band gap (PBG) structure includes periodic layers of a material which confine a range of wavelengths within such periodic layers. Defects formed in a 2-dimensional array of such layers (2-D PBG) provides a guided feedback path for multi-channel optical signals propagated therein. Point defects optionally formed at the edges of the 2-D PBG structure perform the functions of the splitter/combiner, coupling optical signals into and away from such feedback path.

Other objects and features of the present invention will become apparent from the following detailed description considered in conjunction with the accompanying drawings. It is to be understood, however, that the drawings are designed solely for purposes of illustration and do not serve to limit the invention, for which reference should be made to the appended claims.

DETAILED DESCRIPTION

Figure 1:
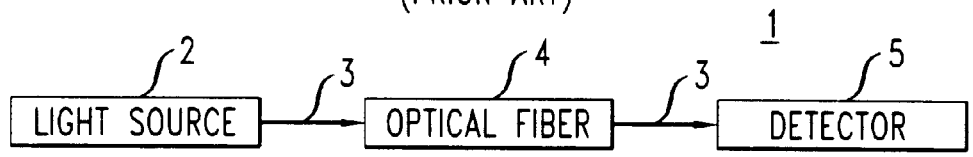
FIG. 1 shows an optical communication system including a light source, an optical fiber, and a detector.
Figure 2A:
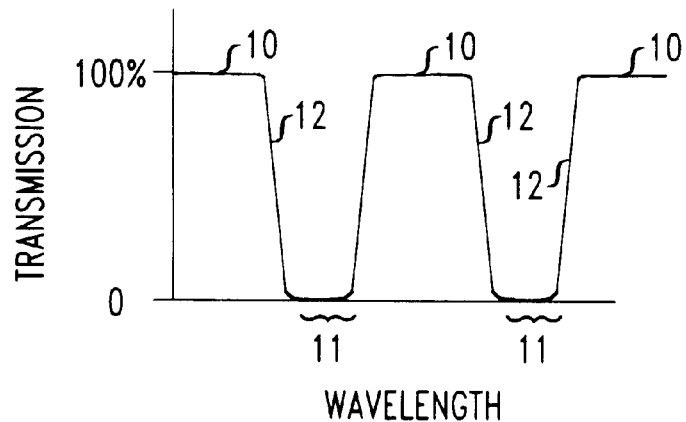
FIG. 2A is a graph depicting the passbands and stopbands of a multi-channel optical signal.
Figure 2B:
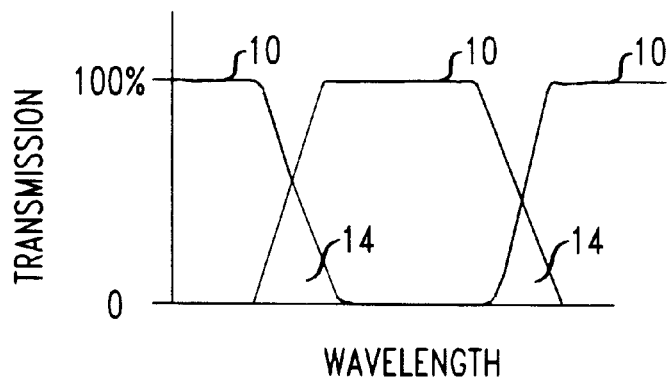
FIG. 2B is a graph illustrating crosstalk between passbands of a multi-channel optical signal.
Figure 3:
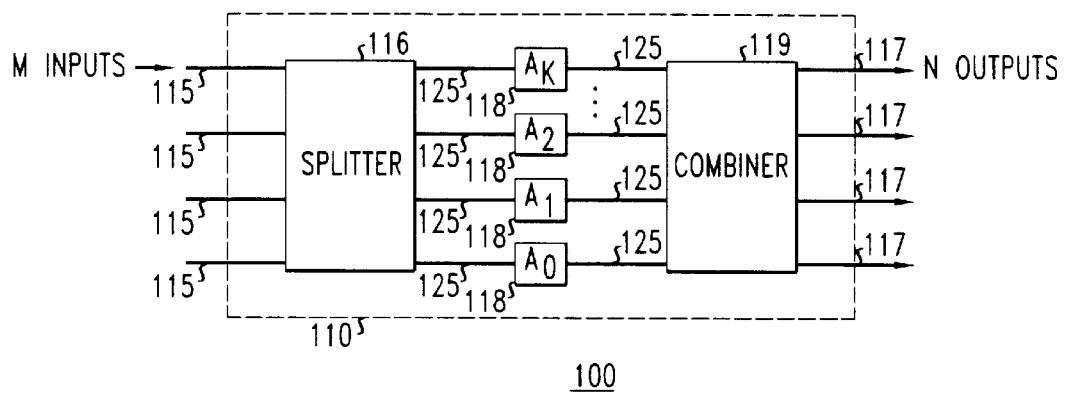
FIG. 3 shows a channel selector of the present invention including input ports, a splitter, optical paths, all-pass optical filters, a combiner, and output ports.

The present invention is directed to a channel selector useful for a multi-channel WDM optical communications system. As shown in FIG. 3, the WDM optical communication system 100 includes input ports 115 coupled to a channel selector 110 which is coupled to output ports 117. Optical communications system 100 optionally includes a variety of devices (not shown) such as light sources, photodetectors, switches, modulators, amplifiers, and filters. Multi-channel optical signals are transmitted in WDM optical communication system 100 along optical fibers (not shown) coupled with input ports 115. Each channel of the multi-channel optical signals has a different wavelength (frequency).

The multi-channel optical signals transmitted in WDM optical communication system 100 are input to channel selector 110 through input ports 115. The channel selector 110 selects one or more channels from the multi-channel optical signals, routing them to predetermined destinations within the optical communications system 100. The channel selector selects one or more channels by first splitting (dividing) portions of the input multi-channel optical signals across two or more optical paths. Thereafter, a desired phase response is applied to the split portions of the multi-channel optical signals. The desired phase response is applied to the split portions of the multi-channel optical signals so the channels therein interfere with each other either constructively or destructively when the split portions of the multi-channel optical signals are combined.

The desired phase response applies a frequency dependent phase shift to each channel in the multi-channel optical signal. Thereafter, when the channels in each optical path are combined, channels having approximately the same phase, constructively interfere with each other. For example, in a 2×2 system (e.g. 2 input ports and 2 output ports), channels having approximately the same phase constructively interfere with each other when the sum of their magnitudes is greater than zero. Channels having phases which differ from each other as a function of $\pi$, destructively interfere with each other because the sum of their magnitudes approximates zero.

The channel selector 110 has a structure which includes a splitter 116, a combiner 119, one or more all-pass optical filters 118, and optical paths 125. The splitter 116 is coupled between input ports 115 and the input of optical paths 125. The combiner 119 is coupled between the output of optical paths 125 and output ports 117. The one or more all-pass optical filters 118 are coupled to optical paths 125.

The splitter 116 determines what portion of input multi-channel optical signals are provided to each optical path 125. Coupling ratios for the splitter 116 and the optical paths 125 determine the portions of the multi-channel optical signals that are directed to each optical path 125. The magnitude of the coupling ratios for the splitter 116 and the optical paths 125 are a matter of design choice. Examples of splitters suitable for directing portions of the multi-channel optical signals to the optical paths are multi-mode interference couplers and star couplers.

Figure 4A:
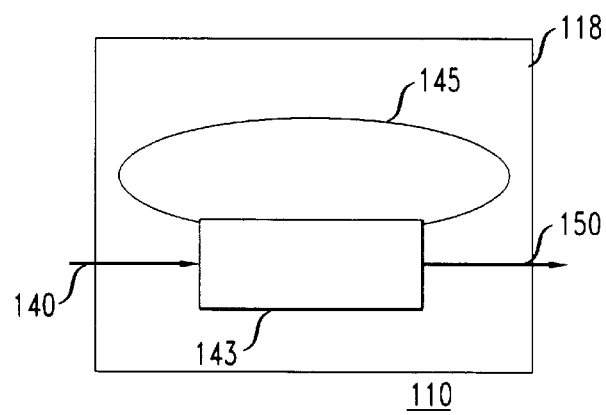
FIG. 4A depicts an all-pass optical filter including one feedback path.

After portions of the multi-channel optical signals are provided to the optical paths 125, the all-pass optical filter 118 applies a frequency dependent phase shift to each channel of the multi-channel optical signals. As shown in FIG. 4A, each of the one or more all-pass optical filters 118 of the channel selector of the present invention includes at least one feedback path 145, a splitter/combiner 143, a filter input port 140, and a filter output port 150. The splitter/combiner 143 is coupled to at least one of the feedback paths 145, the filter input port 140, and the filter output port 150.

When multi-channel optical signals enter the all-pass optical filter 118, a portion of the multi-channel optical signals is provided to the feedback path 145. The portion of the multi-channel optical signals provided to the feedback path 145, circulates repeatedly therein. However, at each pass of the multi-channel optical signals in the feedback path 145, some portion thereof is provided through the splitter/combiner 143 to the filter output port 150. Providing some portion of the multi-channel optical signals circulating in the feedback path 145 through the splitter/combiner 143 to the filter output port 150, incrementally reduces the portion of the multi-channel optical signals circulating in the feedback path 145, in effect removing it therefrom.

Coupling ratios for the splitter/combiner 143 and the feedback path 145 determine the portions of the multi-channel optical signals that are coupled into and away from the feedback path 145. The magnitude of the coupling ratios for the splitter/combiner 143 and the feedback path 145 are a matter of design choice.

The length of the feedback path 145 is typically much shorter (about one order of magnitude) than the length of the multi-channel optical signals. Thus, as each input multi-channel optical signal circulates repeatedly along the feedback path 145, it interferes with itself. That is, the leading edge portions of the multi-channel optical signal circulating in the feedback path interfere with the trailing edge portions of such optical signal being input thereto. Interference between the leading and trailing edges of the multi-channel optical signals shifts the phase of each wavelength in the optical signal as a function of frequency.

Figure 4B:
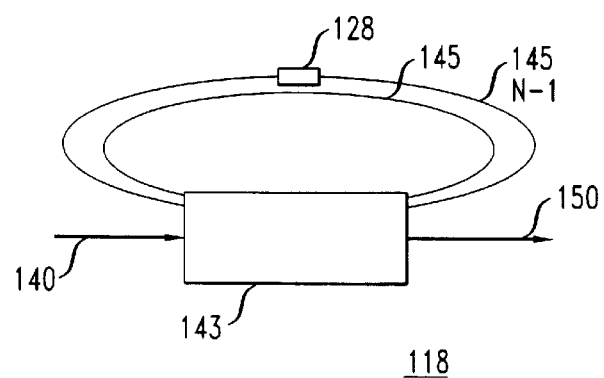
FIG. 4B depicts an all-pass optical filter including more than one feedback path.

The all-pass optical filter 118 optionally has a structure that includes a plurality of feedback paths 145, as shown in FIG. 4B. The plurality of feedback paths 145 also optionally include one or more all-pass optical filters 128. When an all-pass optical filter 128 is included in a feedback path 145, such all-pass optical filter 128 applies a phase shift to the portions of the optical signal circulating in the feedback path 145, independent from any phase shift applied by the feedback path 145.

Figure 5:
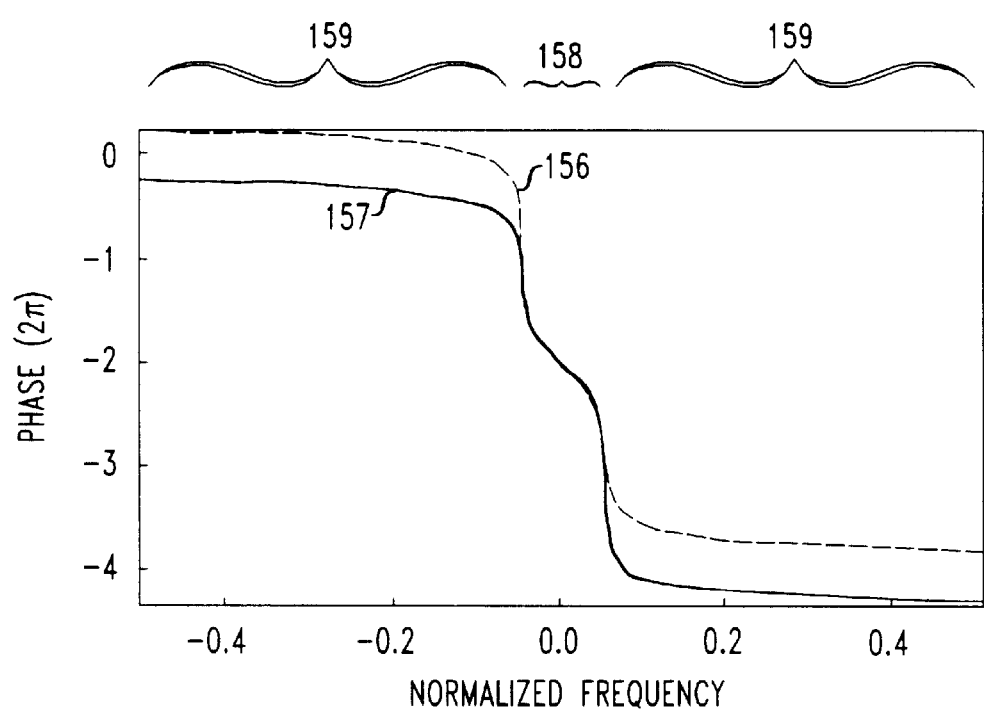
FIG. 5 is a graph of the phase shifts applied by the feedback paths of an eighth order elliptic all-pass optical filter.

For example, FIG. 5 is a graph of the phase shifts applied by feedback paths of an eighth order elliptic optical filter to optical signals transmitted through optical paths 156, 157. In FIG. 5, the normalized frequency is plotted as a function of phase. Frequencies in region 158 of optical paths 156, 157 have the same phase applied thereto. Frequencies in regions 159 of optical paths 156, 157 have phases applied thereto which differ from each other as a function of $\pi$. Since frequencies in region 158 of optical paths 156, 157 have the same phase applied thereto, channels associated with frequencies in region 158 constructively interfere with each other. Since frequencies in regions 159 of optical paths 156, 157 have phases applied thereto which differ from each other as a function of $\pi$, channels associated with frequencies in regions 159 destructively interfere with each other.

Referring to FIG. 3, after the phase shifts are applied to the multi-channel optical signals, the combiner 119 routes selected channels to predetermined destinations in the optical communications system through output ports 117. For a particular output, channels which constructively interfere with each other are selected channels while channels which destructively interfere with each other are not selected channels.

The combiner 119 determines what portion of the phase shifted optical signals are provided to each output port 117 from the optical paths 125. Coupling ratios for the combiner 119 and the optical paths 125 determine the portions of the phase shifted optical signals that are directed to each output port 117. The magnitude of the coupling ratios for the combiner 119 and the optical paths 125 are a matter of design choice. Examples of combiners suitable for directing portions of the multi-channel optical signals to the optical paths are multi-mode interference couplers and star couplers.

Figure 6A:
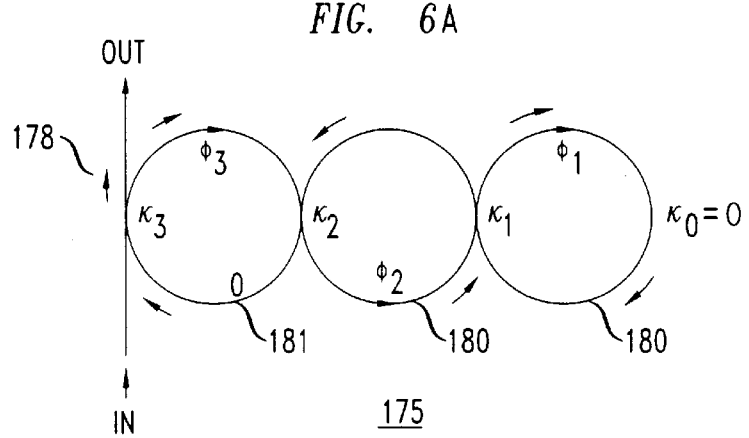
FIG. 6A illustrates an embodiment of the all-pass optical filter wherein the feedback path includes a series of coupled rings.
Figure 6B:
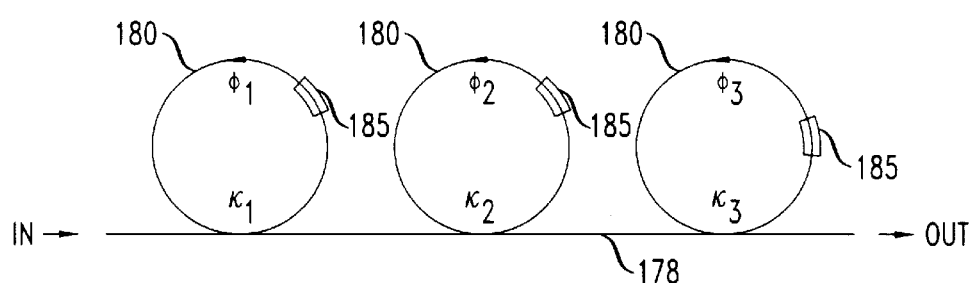
FIG. 6B illustrates an embodiment of the all-pass optical filter wherein the feedback path has a ring cascade structure.

In one embodiment of the present invention, the at least one feedback path of the all-pass optical filter 130 has a ring resonator structure, as shown in FIGS. 6A–6B. The ring resonator structure includes one or more ring resonators 180, 181 wherein each of the ring resonators is a closed loop. The one or more ring resonators are optionally arranged as a ring cascade or as a series of coupled rings.

FIG. 6A depicts a structure with a series of coupled rings 175, wherein a first ring resonator 181 is coupled with the splitter/combiner 178 and then the remaining ring resonators 180 are coupled one to another. For the series of coupled ring resonators 175, the feedback path has a length which includes the length of each of the ring resonators 180, 181. Filter parameters such as the coupling coefficients, $\kappa$, for each ring, denoted as $\kappa_1$, $\kappa_2$, and $\kappa_3$, as well as the phase, $\phi$, of each ring resonator, denoted as $\phi_1$, $\phi_2$, and $\phi_3$, are also shown. The coupling coefficients and the phase of the ring resonators are determined based on the desired phase response.

FIG. 6B shows the ring cascade structure, wherein each ring resonator 180 is independently coupled to a splitter/combiner 178. For the ring cascade structure, the feedback path has a length which includes the length of each of the ring resonators 180.

Figure 7A:
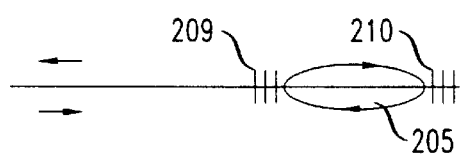
FIG. 7A illustrates an embodiment of the all-pass optical filter wherein the feedback path combines a cavity with a plurality of reflectors, wherein at least one reflector has a reflectivity of about 100%.
Figure 7B:
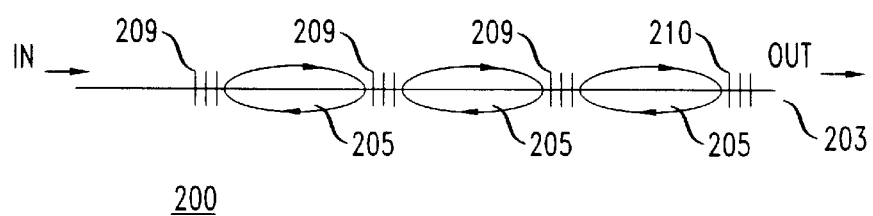
FIG. 7B illustrates an embodiment of the all-pass optical filter wherein the feedback path includes a plurality of cavities and a plurality of reflectors.

In an alternate embodiment of the present invention, the at least one feedback path of the all-pass optical filter includes at least one cavity 205 and a plurality of reflectors 209, 210, as shown in FIG. 7A. At least one of the plurality of reflectors 210 has a reflectivity of about 100%, while the remaining reflectors are partial reflectors 209 with reflectivities less than 100%. Twice the length of the cavity 205 approximates the path length of the feedback path. The partial reflectors 209 perform the functions of the splitter/combiner. Multiple feedback paths are optionally formed by combining a plurality of reflectors 209, 210 and a plurality of cavities 205, as shown in FIG. 7B.

Figure 8:
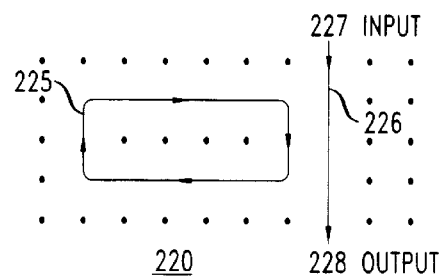
FIG. 8 illustrates an embodiment of the all-pass optical filter wherein the feedback path includes a photonic band gap (PBG) structure.

Another embodiment of the present invention uses a photonic band gap (PBG) structure 220 as the feedback path of the all-pass optical filter, as shown in FIG. 8. FIG. 8 is a top view of the photonic band gap structure 220. The photonic band gap (PBG) structure includes periodic layers of a dielectric material which confine a range of frequencies within such periodic layers (not shown). Defects formed in a 2-dimensional array of such dielectric layers (2-D PBG) provides a guided feedback path 225 along which optical pulses are transmitted. Point defects (not shown) optionally formed at the edges of the 2-D PBG structure perform the functions of the splitter/combiner, coupling optical signals into and out of the feedback path.

The phase shift applied to each channel in the multi-channel optical signal by the all-pass optical filters can be designed so that the sum or difference gives two all-pass functions which approximate 0 or 1 for each channel. For a 2×2 example, when the frequency response of each all-pass function is:

$$A_1(\omega)=e^{j\phi_1(\omega)} \text{ and } A_2(\omega)=e^{j\phi_2(\omega)} \tag{1}$$

where $\omega$ is the angular frequency and $\phi(\omega)$ is the phase, the sum and difference of $A_1$ and $A_2$ provides two expressions for the magnitude response, $G(\omega)$ and $H(\omega)$, respectively:

$$G(\omega) = \frac{1}{2}[A_1(\omega) + A_2(\omega)] \tag{2}$$

$$H(\omega) = \frac{1}{2}[A_1(\omega) - A_2(\omega)] \tag{3}$$

When both all-pass functions $A_1$ and $A_2$ have the same phase, $G(\omega)$ is maximum and $H(\omega)$ is minimum. The phase response determines the location of the poles and the zeros. Additionally, $G(\omega)$ and $H(\omega)$, are power complementary, since $$|G(\omega)|^2+|H(\omega)|^2=1 \tag{4}$$

Figure 9A:
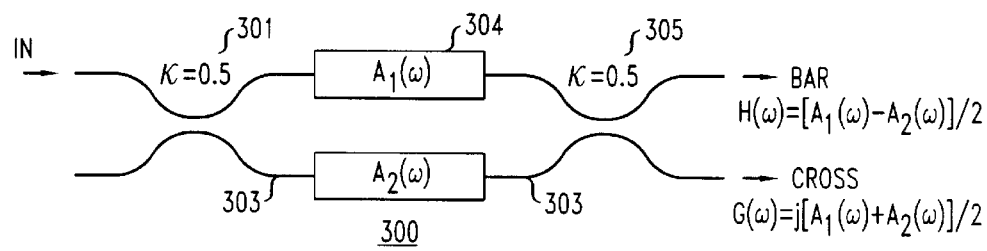
FIG. 9A is a schematic drawing of an embodiment of the channel selector of the present invention including a coupled cavity structure.

This sum and difference of the two all-pass functions described above can be implemented in an optical filter using directional couplers as shown in structure 300 of FIG. 9A. Structure 300 includes directional couplers 301, 305, optical paths 303, and all-pass optical filters 304. Directional coupler 301 provides the function of the splitter and directional coupler 305 provides the function of the combiner. When the power coupling ratio of each directional coupler 301, 305 is $\kappa$=50%, the sum and difference of the two all-pass functions $A_1$ and $A_2$ described in equations 2 and 3 are realized in the cross and bar output ports as shown in FIG. 9A.

All-pass optical filters 304 suited for structure 300 can be realized with a ring resonator structure. For example, for an Nth order optical filter having a cascade ring resonator structure, the coupling ratios and the pole locations for each ring are calculated from the transfer function $$A(z)|_{z=e^{j\omega}}=e^{j\phi}(\rho e^{-j\phi}-z^{-1}/1-\rho e^{j\phi}z^{-1}) \tag{5}$$

wherein the directional coupler bar-state amplitude transmission is designated by $\rho=\sqrt{1-\kappa}$, where $\kappa$ is the coupling ratio of the ring resonator, and φ is a phase associated with one feedback path. The free spectral range (FSR) is given by FSR≡c/(n$_g$2πR), where R is the ring radius, and n$_g$ is the effective group index of the fundamental mode. Poles are determined from the root of the denominator of equation (5), while the zeros are determined from the root of the numerator.

Figure 9B:
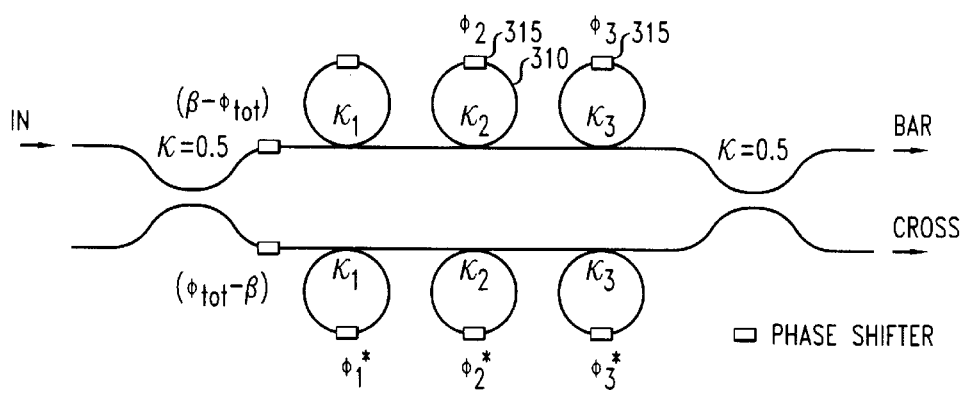
FIG. 9B is an embodiment of the channel selector of the present invention wherein the coupled cavity structure of FIG. 9A is realized with a ring resonator structure.

From equation (5), to produce a pole at $z_n$, for the structure shown in FIG. 9B, requires a coupling ratio of $\kappa_n=1-|z_n|^2$ and a phase response of $\phi_n=\arg(z_n)$. The rings 310 are nominally the same circumference with an incremental length, Δl, or index change, Δn over a length l, added to each ring to realize the phase response, e.g.

$$\phi_n = \frac{2\pi\Delta n l}{\lambda} \text{ or } \phi_n = \frac{2\pi n \Delta l}{\lambda}.$$

Also, $\phi_{tot}$ equals the sum of all $e^{j\Phi_n}$ for each all-pass filter. β is a constant determined from adding equations (2) and (3) and evaluating the sum at ω=0.

Heaters 315 are optionally deposited on a section of the ring, as shown in FIG. 9B, to locally change the index and create the desired phase. These Nth order optical filters require N+2 couplers and N+2 phase shifts, at most. This is in contrast to the general waveguide filter architecture which requires 2N+1 couplers and 2N phase shifters to realize an Nth order filter.

Figure 9C:
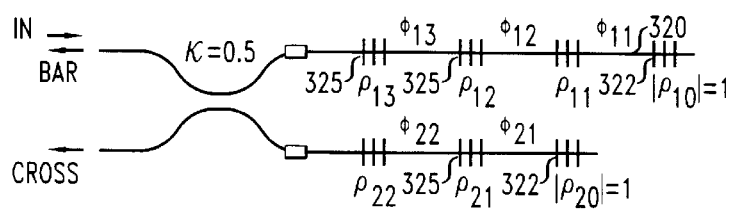
FIG. 9C is an embodiment of the channel selector of the present invention wherein the coupled cavity structure of FIG. 9A is realized with a reflective structure.

Another coupled cavity structure 300 can be realized with reflectors such as Bragg gratings or thin films of alternating high and low refractive index. Such a structure includes one reflector having an amplitude reflectance of unity, i.e. $|\rho_0|=1$. FIG. 9C shows a coupled cavity structure with two all-pass reflective lattice filters 320. Each lattice filter includes partial reflectors 325 and one reflector 322 with 100% reflectivity. The FSR is approximated from FSR=c/(2n$_g$L) where L is the nominal cavity length. The cavity length or index is varied for each stage to create the relative phase $\phi_n$. In equation (5), the amplitude reflectances are given by ρ. It is desirable for the partial reflectors 325 to be essentially wavelength independent over the FSR so that the poles and zeros are essentially constant. Thin films with alternating layers of high and low index or Bragg gratings are optionally used to realize the partial reflectors. In either case, the index difference must be large enough to satisfy the wavelength independence constraint.

Figure 10:
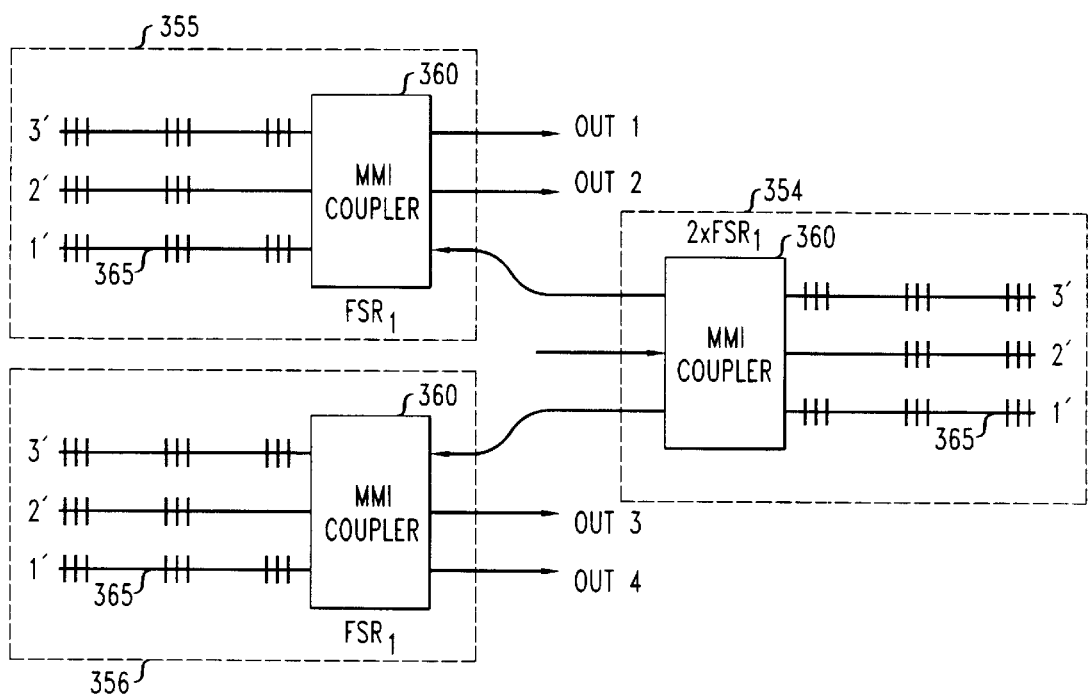
FIG. 10 shows three channel selectors arranged as a concatenated series.

The channel selector of the present invention is optionally arranged as a concatenated series 350, as shown in FIG. 10. Concatenated series 350 includes three channel selectors 354, 355, 356. Each channel selector 354, 355, 356 has a multi-mode interference coupler 360 and a plurality of reflective cavities 365. Multi-channel optical signals input to a concatenated series are subjected to two or more channel selections. For example, multi-channel optical signals input to concatenated series 350 are directed to channel selector 354 where a first channel selection is performed. Thereafter, a portion of the passband selected by channel selector 354 is directed to channel selectors 355, 356 where a second channel selection is performed.

The following examples are provided to illustrate specific embodiments of the present invention.

EXAMPLE 1

A channel selector with an 8$^{th}$ order elliptic optical filter design. The 8$^{th}$ order elliptic filter has a 30 dB stopband rejection for both G(ω) and H(ω) and a cutoff width of about 0.1×FSR. The stopband rejection requirement of 30 dB H(ω) implies a passband flatness of 0.004 dB for G(ω). The details for determining the filter responses G(ω) and H(ω) as well as all-pass functions $A_1(\omega)$ and $A_2(\omega)$ are discussed in Mitra, S et al., "Handbook for Digital Signal Processing", John Wiley and Sons, N.Y., (1993), which is incorporated herein by reference. The all-pass functions are 4$^{th}$ order functions, $$A_1(z) = e^{j\beta}\frac{z^{-N}D_1^*(z^{*-1})}{D_1(z)} \text{ and } A_2(z) = e^{-j\beta}z^{-N}\frac{D_2^*(z^{*-1})}{D_2(z)},$$

where $D_1(z)$ and $D_2(z)$ are polynomials $(D(z)=d_0+d_1z^{-1}+\ldots d_nz^{-n})$ whose coefficients $(d_n)$ are listed in Table 1.

TABLE 1

| $D_n$ | $D_1(z)$ | $D_2(z)$ |
|---|---|---|
| $d_0$ | 1 | 1 |
| $d_1$ | −3.4645 − 0.1483i | −3.4645 + 0.1483i |
| $d_2$ | 4.6227 + 0.3638i | 4.6227 − 0.3638i |
| $d_3$ | −2.8027 − 0.3076i | −2.8027 + 0.3076i |
| $d_4$ | 0.6516 + 0.0864i | 0.6516 − 0.0864i |

The phase factor β=−1.39492 is given in radians. Given $A_1(z)$ and $A_2(z)$, the coupling ratios κ, phases φ, and partial reflectances ρ are determined via equation (5) for the cascade ring and the cavity structure or by step-down recursion relations for the lattice structures (coupled ring or coupled cavity).

Figure 11A:
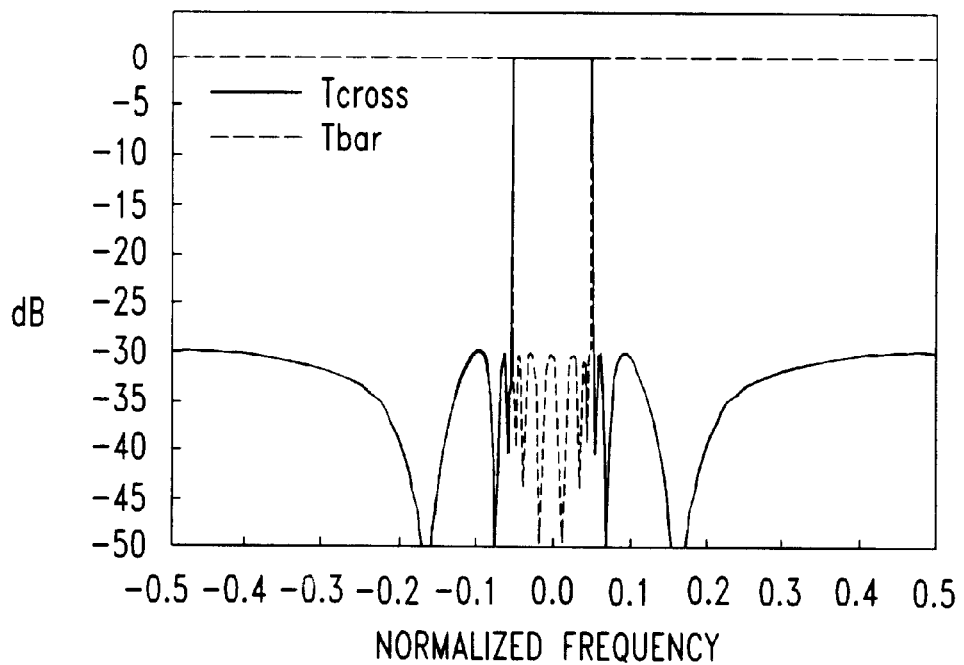
FIG. 11A is a graph of the magnitude response of an eighth order elliptic optical filter described in Example 1.

FIG. 11A shows the magnitude response of the 8$^{th}$ order elliptic filter for the transmission cross and bar states. In FIG. 11A the filter transmission (dB) is plotted as a function of the normalized frequency. The normalized frequency range of 0 to 1 corresponds to one FSR of the frequency response. The graph of FIG. 11A illustrates that in the 8$^{th}$ order design, G(ω) and H(ω) each have a negligible passband transmission rejection and a stopband transmission rejection of 30 dB.

Figure 11B:
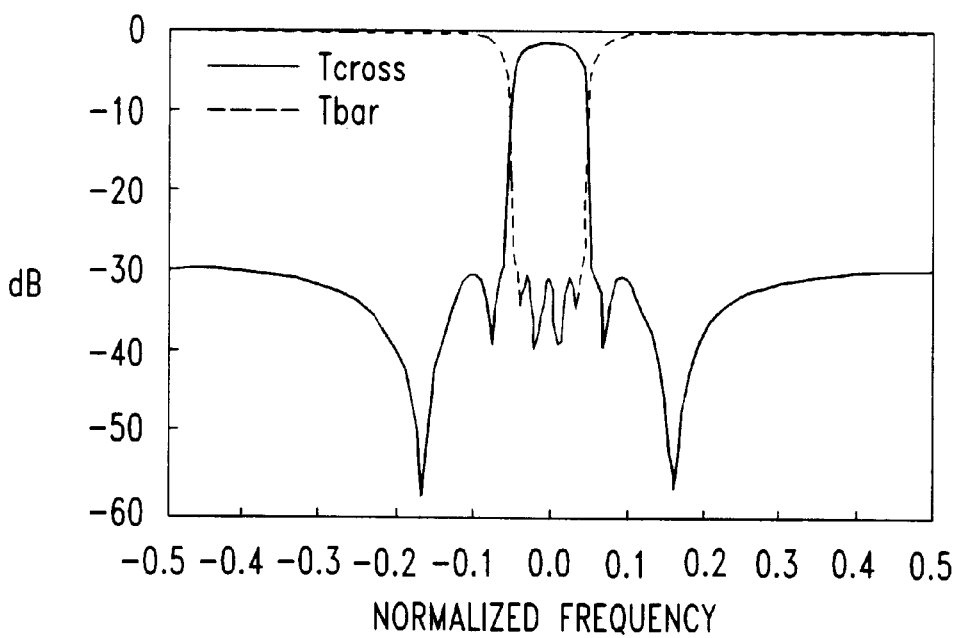
FIG. 11B is a graph of the magnitude response of the eighth order elliptic optical filter of FIG. 11A which includes a feedback loss of 0.2 dB/feedback path.

FIG. 11B is a graph of the magnitude response of the 8$^{th}$ order elliptic filter having a loss of 0.2 dB/feedback path. The peak passband transmission of G(ω) is reduced, but the 30 dB stopband rejection of G(ω) and H(ω) is retained.

EXAMPLE 2

Figure 12:
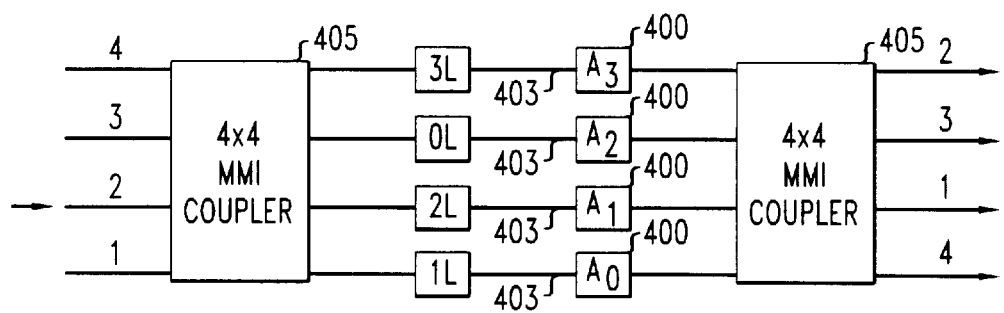
FIG. 12 illustrates a 4×4 channel selector described in Example 2.
Figure 13A:
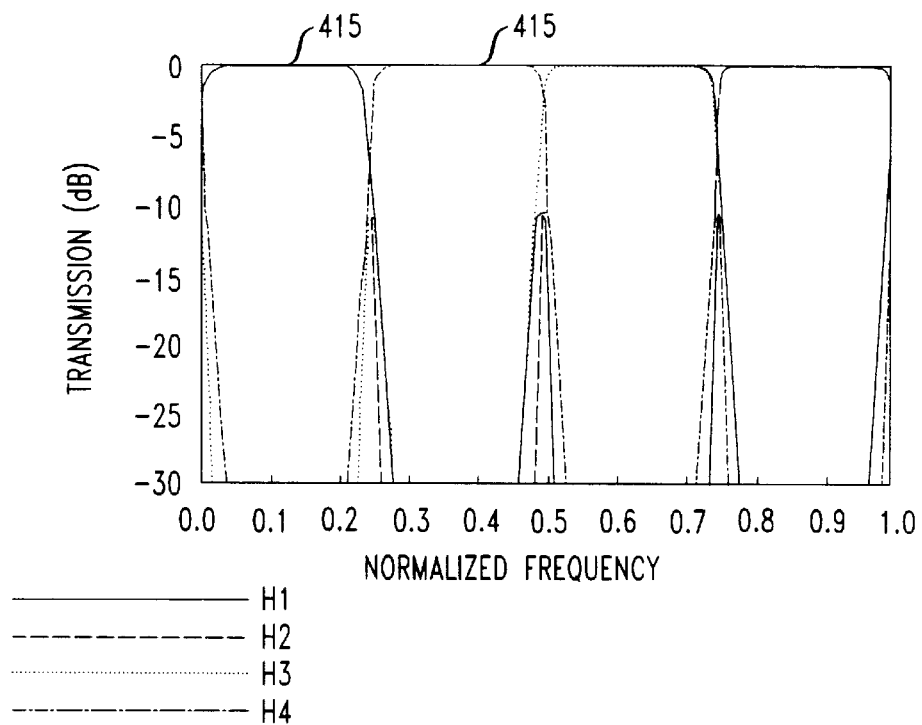
FIG. 13A is a graph of the magnitude response of the channel selector described in Example 2.

FIG. 12 depicts a 4×4 channel selector with all-pass filters 400 positioned on each optical path 403 connecting two multi-mode interference (MMI) couplers 405. Each optical path 403 has a different path length denoted as 0L, 1L, 2L, and 3L. The all-pass filters 400 in each optical path 403 flatten the passband response of the channel selector without increasing the passband loss. FIG. 13A is a graph of the spectral response for the channel selector shown in FIG. 12. In FIG. 13A the frequency response for each output corresponds to $H_1$, $H_2$, $H_3$, and $H_4$. The passband of each output response has a peak transmission range that is flat, denoted as 415 on FIG. 13A.

Figure 13B:
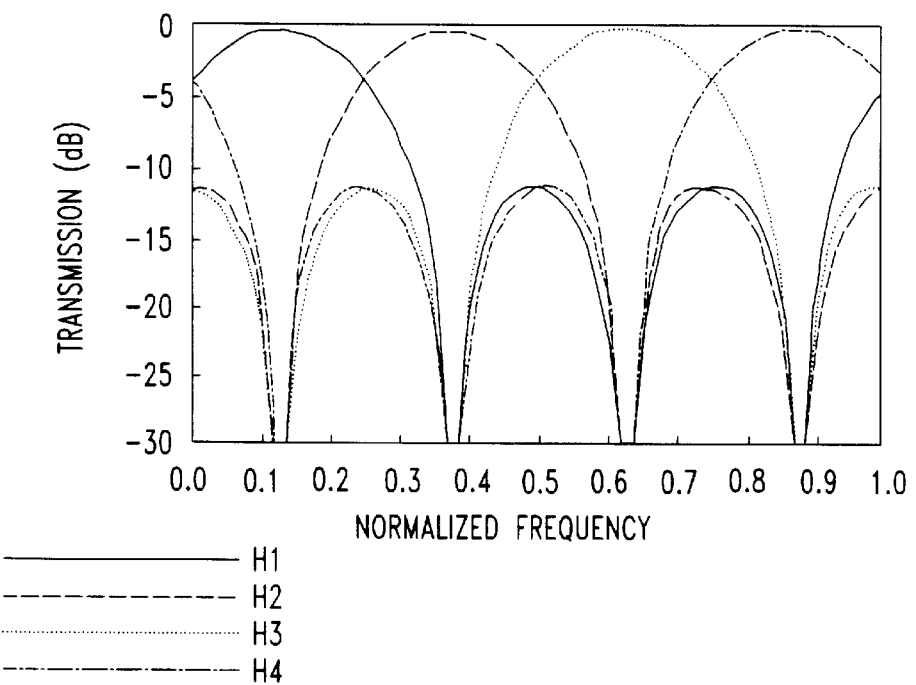
FIG. 13B is a graph of the magnitude response of a 4×4 MMI coupler without all-pass optical filters in the optical paths connecting the two couplers.

For comparison purposes a graph of the spectral response of a 4-stage filter without all-pass filters, is shown in FIG. 13B. The peak transmission ranges of $H_1$, $H_2$, $H_3$, and $H_4$ in FIG. 13B, lack passband flatness when compared to the peak transmission ranges of FIG. 13A. Additionally, the useable width of each band, determined for a stopband rejection of 30 dB, increased from about 6% for the passbands of FIG. 13B to at least 74% for the passbands of FIG. 13A.

EXAMPLE 3

Figure 14:
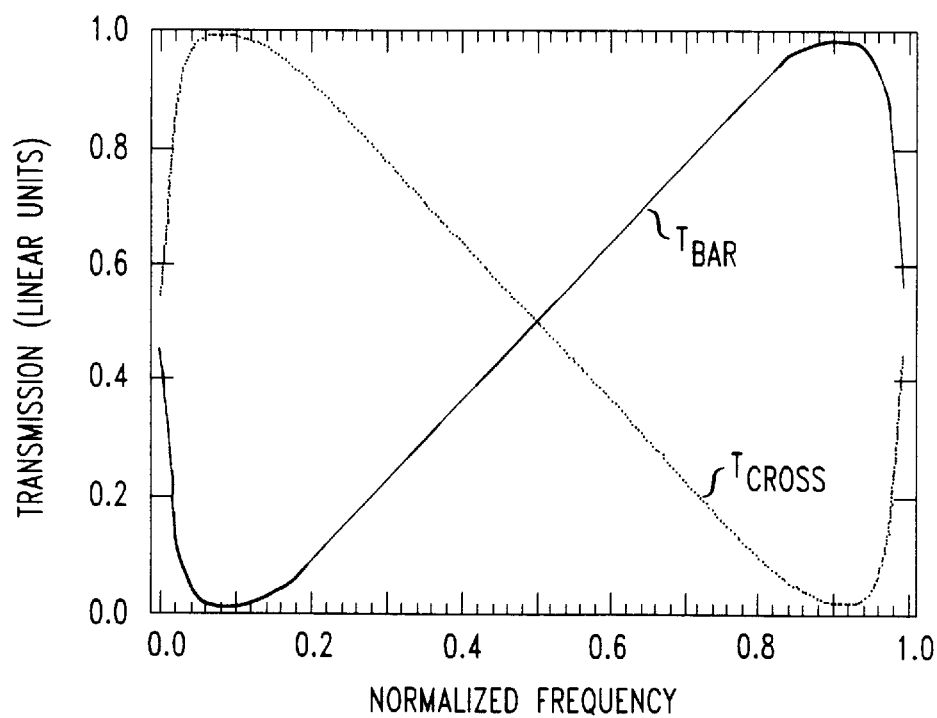
FIG. 14 is a graph of the magnitude response of a MZI which has a single stage all-pass filter in each arm.

A filter with a linear square magnitude response over a frequency range of 0.15≦v≦0.85 was designed. The filter is a MZI with a single stage all-pass filter in each arm. The pole magnitudes and phases for the all-pass filters are 0.2925∠0.0088 (radians) and 0.7865∠−0.0099 (radians), respectively. The remaining design parameters are κ=0.5, φ=−0.7121, and 2β=−1.5896 rad. The square magnitude response for this second-order filter is shown in FIG. 14. The square magnitude response is linear to within about ±0.005 over 0.18≦v≦0.82. Filters with such a square magnitude response are suitable as frequency discriminators for laser wavelength stabilization and modulators which respond linearly to the input signal for analog transmission.

EXAMPLE 4

Figure 15A:
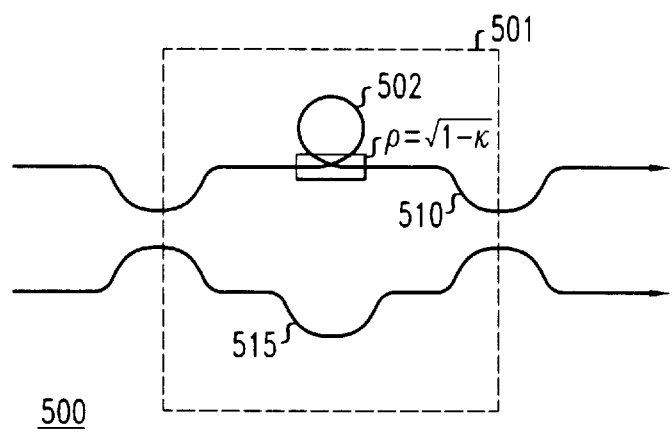
FIG. 15A depicts the structure of the filter described in Example 4.

A filter 500 having the structure shown in FIG. 15A was designed. The filter 500 is a MZI 501 with a single ring resonator 502 in one arm 515. Each arm 502, 515 of the MZI 501 has a specified length (M, N). The ratio (ρ) of the lengths (M, N) of each arm 502, 515 applies frequency dependent phase changes to multi-channel optical signals transmitted therethrough. When the ratio of the lengths of each arm of the MZI are varied, the filter has a stair-case magnitude response which provides a particular transmission response. For a stair-case magnitude response, both the cross and bar transmissions typically have intermediate steps that are about constant.

Figure 15B:
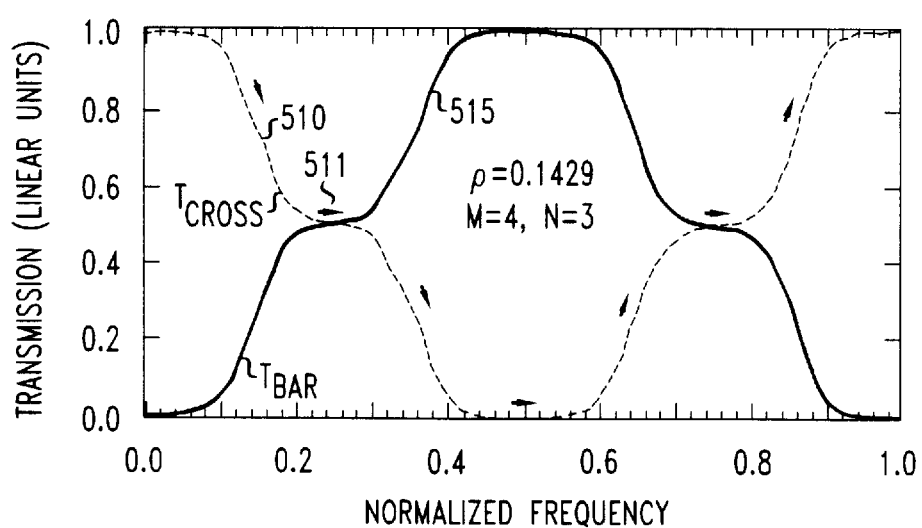
FIG. 15B is a graph of the magnitude response of the filter depicted in FIG. 15A.

A MZI with arm lengths 502 (M=4), 515 (N=3) has the magnitude response shown in FIG. 15B. The transmission response of arm 502 and the transmission response 515 include cut-off regions which have intermediate steps 511. Frequencies which correspond to the intermediate steps 511 are partially transmitted by the filter. Filters with stair-case magnitude responses are suitable as multi-level optical modulators.

The invention claimed is:

1. A channel selector useful for multi-channel optical communication systems, comprising:
   a plurality of input ports;
   a plurality of output ports;
   a splitter coupled to the plurality of input ports and coupled to two or more optical paths, wherein the splitter is configured to split at least a portion of input multi-channel optical signals from the plurality of input ports across the two or more optical paths;
   one or more all-pass optical filters coupled to at least one of the two or more optical paths, wherein each of the one or more all-pass optical filters has a filter input port, a filter output port, a splitter/combiner, and at least one feedback path, wherein the at least one feedback path of each all-pass optical filter comprises at least one ring resonator coupled to the splitter/combiner, and wherein each of the one or more all-pass optical filters is configured to apply a desired phase response with frequency to the portion of the multi-channel optical signal input thereto; and
   a combiner coupled to the two or more optical paths, wherein the combiner is configured to combine the portions of the multi-channel optical signals output from the one or more all-pass optical filters for transmission through one or more of the plurality of output ports, the frequency response of phase of at least one all-pass filter selected such that a corresponding channel, when recombined has phases differing as a function of π causing destructive interference.

2. The channel selector of claim 1 wherein the at least one feedback path comprises a plurality of ring resonators arranged as a ring cascade.

3. The channel selector of claim 1 wherein the at least one feedback path comprises a plurality of ring resonators arranged as a series of coupled rings.

4. The channel selector of claim 1 wherein the one or more all-pass optical filters are arranged as a concatenated series.

5. The channel selector of claim 1 wherein the splitter is selected from the group consisting of a multi-mode interference coupler and a star coupler.

6. The channel selector of claim 1 wherein the combiner is selected from the group consisting of a multi-mode interference coupler and a star coupler.

7. A method of selecting a channel from a multi-channel optical signal comprising the steps of:
   providing multi-channel optical signals to a splitter through a plurality of input ports;
   splitting at least a portion of the multi-channel optical signals provided to the splitter across two or more optical paths;
   inputting at least a portion of the split multi-channel optical signals to one or more all-pass optical filters coupled to at least one of the two or more optical paths, wherein each of the one or more all-pass optical filters has a filter input port, a filter output port, a splitter/combiner, and at least one feedback path, and wherein the at least one feedback path of each all-pass optical filter comprises at least one ring resonator coupled to the splitter combiner;
   applying a desired phase response to the portion of the multi-channel optical signals input to the one or more all-pass optical filters; and combining portions of the multi-channel optical signals output from the all-pass optical filter in a combiner for transmission through one or more of a plurality of output ports, the frequency response of phase of at least one all-pass filter selected such that a corresponding channel, when recombined has phases differing as a function of π causing destructive interference.

8. The method of claim 7 wherein the at least one feedback path comprises a plurality of ring resonators arranged as a ring cascade.

9. The method of claim 7 wherein the at least one feedback path comprises a plurality of ring resonators arranged as a series of coupled rings.

10. The method of claim 7 wherein the one or more all-pass optical filters are arranged as a concatenated series.

11. The method of claim 7 wherein the splitter is selected from the group consisting of a multi-mode interference coupler and a star coupler.

12. The method of claim 7 wherein the combiner is selected from the group consisting of a multi-mode interference coupler and a star coupler.

13. A channel selector useful for multi-channel optical communication systems, comprising:
   a plurality of input ports;
   a plurality of output ports;
   a splitter coupled to the plurality of input ports and coupled to two or more optical paths, wherein the splitter is configured to split at least a portion of input multi-channel optical signals from the plurality of input ports across the two or more optical paths;
   one or more all-pass optical filters coupled to at least one of the two or more optical paths, wherein each of the one or more all-pass optical filters has a filter input port, a filter output port, a splitter/combiner, and at least one feedback path wherein the at least one feedback path of each all-pass optical filter comprises one or more cavities and a plurality of reflectors, and wherein one reflector of the plurality of reflectors has a reflectivity of about 100%, and wherein each of the one or more all-pass optical filters is configured to apply a desired phase response to the portion of the multi-channel optical signal input thereto; and a combiner coupled to the two or more optical paths, wherein the combiner is configured to combine the portions of the multi-channel optical signals output from the one or more all-pass optical filters for transmission through one or more of the plurality of output ports.

14. The channel selector of claim 13 wherein one or more reflectors in the plurality of reflectors is a partial reflector.

15. A method of selecting a channel from a multi-channel optical signal comprising the steps of:

providing multi-channel optical signals to a splitter through a plurality of input ports;

splitting at least a portion of the multi-channel optical signals provided to the splitter across two or more optical paths;

inputting at least a portion of the split multi-channel optical signals to one or more all-pass optical filters coupled to at least one of the two or more optical paths, wherein each of the one or more all-pass optical filters has a filter input port, a filter output port, a splitter/combiner, and at least one feedback path wherein the at least one feedback path of each all-pass optical filter comprises one or more cavities and a plurality of reflectors, and wherein one reflector of the plurality of reflectors has a reflectivity of about 100%;

applying a desired phase response to the portion of the multi-channel optical signals input to the one or more all-pass optical filters; and combining portions of the multi-channel optical signals output from the all-pass optical filter in a combiner for transmission through one or more of a plurality of output ports.

16. The method of claim 15 wherein one or more reflectors in the plurality of reflectors is a partial reflector.

17. A channel selector useful for multi-channel optical communication systems, comprising:

a plurality of input ports;

a plurality of output ports;

a splitter coupled to the plurality of input ports and coupled to two or more optical paths, wherein the splitter is configured to split at least a portion of input multi-channel optical signals from the plurality of input ports across the two or more optical paths;

one or more all-pass optical filters coupled to at least one of the two or more optical paths, wherein each of the one or more all-pass optical filters has a filter input port, a filter output port, a splitter/combiner, and at least one feedback path, wherein the at least one feedback path of each all-pass optical filter comprises a photonic bandgap structure coupled to the splitter combiner, and wherein each of the one or more all-pass optical filters is configured to apply a desired phase response with frequency to the portion of the multi-channel optical signal input thereto; and a combiner coupled to the two or more optical paths, wherein the combiner is configured to combine the portions of the multi-channel optical signals output from the one or more all-pass optical filters for transmission through one or more of the plurality of output ports, the frequency response of phase of at least one all-pass filter selected such that a corresponding channel, when recombined has phases differing as a function of $\pi$ causing destructively interference.

18. A method of selecting a channel from a multi-channel optical signal comprising the steps of:

providing multi-channel optical signals to a splitter through a plurality of input ports;

splitting at least a portion of the multi-channel optical signals provided to the splitter across two or more optical paths;

inputting at least a portion of the split multi-channel optical signals to one or more all-pass optical filters coupled to at least one of the two or more optical paths, wherein each of the one or more all-pass optical filters has a filter input port, a filter output port, a splitter/combiner, and at least one feedback path, and wherein the at least one feedback path of each all-pass optical filter comprises at least one photonic band gap (PBG) structure coupled to the splitter combiner;

applying a desired phase response to the portion of the multi-channel optical signals input to the one or more all-pass optical filters; and combining portions of the multi-channel optical signals output from the all-pass optical filter in a combiner for transmission through one or more of a plurality of output ports.

* * * * *